Feb. 14, 1933.  A. JENSEN  1,897,613
APPARATUS FOR TREATING LIQUIDS
Filed March 12, 1930  5 Sheets-Sheet 2

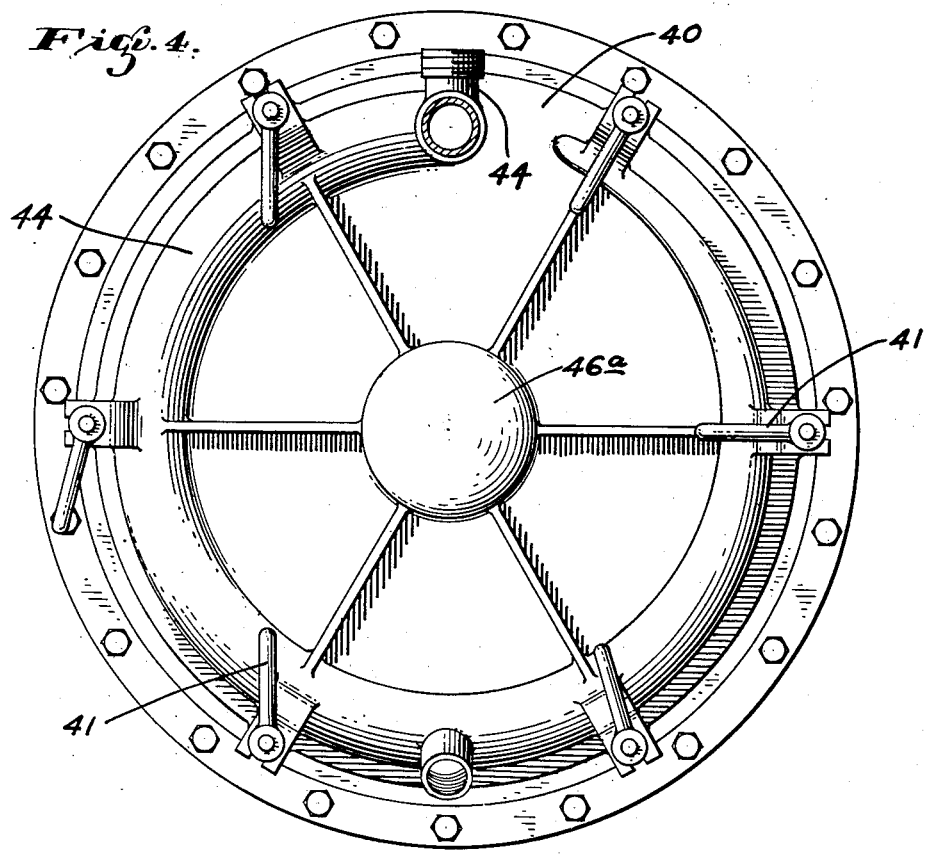
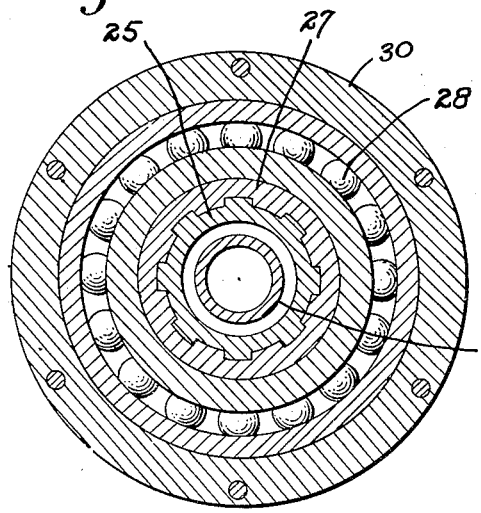
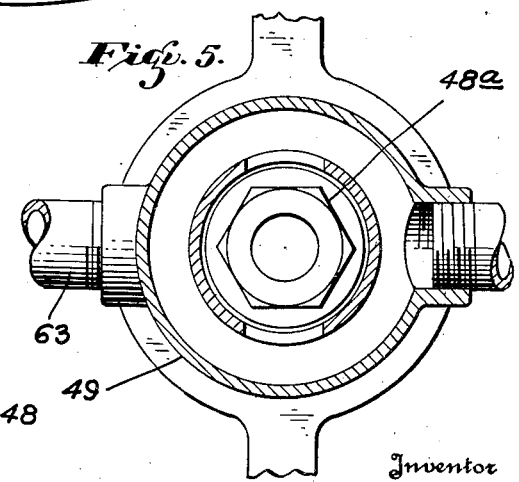

Feb. 14, 1933.                A. JENSEN                1,897,613
                    APPARATUS FOR TREATING LIQUIDS
                      Filed March 12, 1930      5 Sheets-Sheet 5
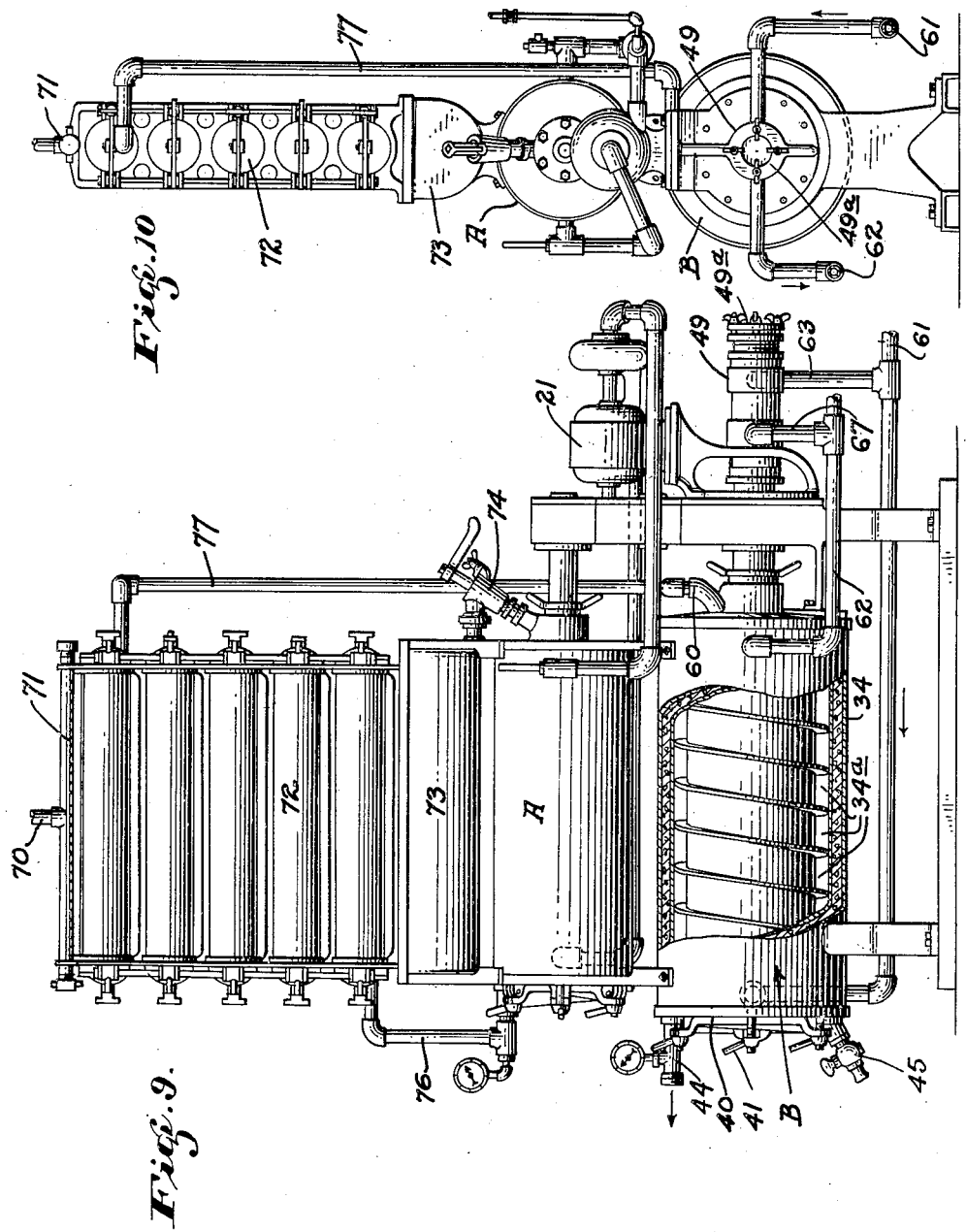

Patented Feb. 14, 1933

1,897,613

UNITED STATES PATENT OFFICE

AAGE JENSEN, OF LOS ANGELES, CALIFORNIA

APPARATUS FOR TREATING LIQUIDS

Application filed March 12, 1930. Serial No. 435,288.

My invention relates to apparatus for treating liquids, and especially intended for heating or cooling or reconstructing liquids containing organic matter, such as milk, malt extract, fruit juices, egg meat, blood, or the like.

The principal object of this invention is to recondition and/or pasteurize products as above mentioned so as to meet the stringent present-day requirements, and not only comply with but actually anticipate future engineering and sanitary requirements in the art of treating liquids containing solids.

A further object is to provide complete accessibility to an apparatus suited to carry out such treatment as is above mentioned.

It is desirable to maintain a high speed of rotation of the treating surfaces so that the liquid treated gets the benefits of increased radiation when subjected to pasteurization or cooling. This permits of maintaining stated capacities within the apparatus for a longer period of time when pasteurizing fluid substances such as milk or cream, without having to stop to remove precipitated adhering coating of organic matter from the treating surfaces. The improved device permits of maintaining continuous temperatures well above 185° F. while pasteurizing fluid substances which contain a relatively large percentage of protein matter, such as milk or cream, without inducing noticeable heated flavors or causing precipitation or objectionable physical changes in the same.

The construction of the device is such that free air, the cause of oxidation of the fatty acids, is reduced to a minimum. The only contact with air to which the product is exposed while passing through the device is the relatively small amount normally but intimately incorporated with the product. My improved apparatus has means for forcing the treating medium in contact with the heating or cooling surface in the form of a positive circulating device. The flow of the treating medium is through helical ducts which are part of the jacket and through radial and annular ducts which are a part of the revolving cylinder. Thus the treating medium completely surrounds the product undergoing treatment, and the latter moves in a progressive, thin, helical layer between the jacket and the revolving cylinder.

The improved apparatus provides for the intake of the liquid at the drive end with impeller means for forcing the discharge at the exit end. The advantage in this construction is obvious. It is a well known fact that liquids of heavy protein content when in motion do not precipitate to an objectionable degree at low pasteurizing temperatures, meaning below 145 degrees Fahrenheit, whereas coagulation readily occurs at higher temperatures unless prevented.

By the employment of greatly increased surface travel to what has heretofore been considered possible, the liquid treated is made to move rapidly between the treating surfaces in a progressive helical flow, which prevents coagulation and renders it capable of maintaining relatively high pasteurizing temperatures with a minimum of the precipitated material adhering to the heating surfaces.

Another outstanding improvement of the new device is the means for sealing the liquid area outside of and away from contamination. The old form of seal is one of the constructional faults that health authorities now object to, as the contact of fibrous packing with the food product being treated is not sanitary.

A better understanding of my invention may be had by reference to the accompanying drawings and specifications, in which I have shown a preferred embodiment thereof.

In the drawings,

Fig. 4 is a plan view of the cover and discharge end of the liquid treating unit;

Fig. 5 is a sectional view taken on the line V—V of Fig. 1;

Fig. 6 is a sectional view taken on the line VI—VI of Fig. 1;

Fig. 9 is a side view of a typical, self-contained processing apparatus, with a portion of the liquid-treating unit cut away;

Fig. 10 is an end view of the apparatus shown in Fig. 9.

Figure 1:
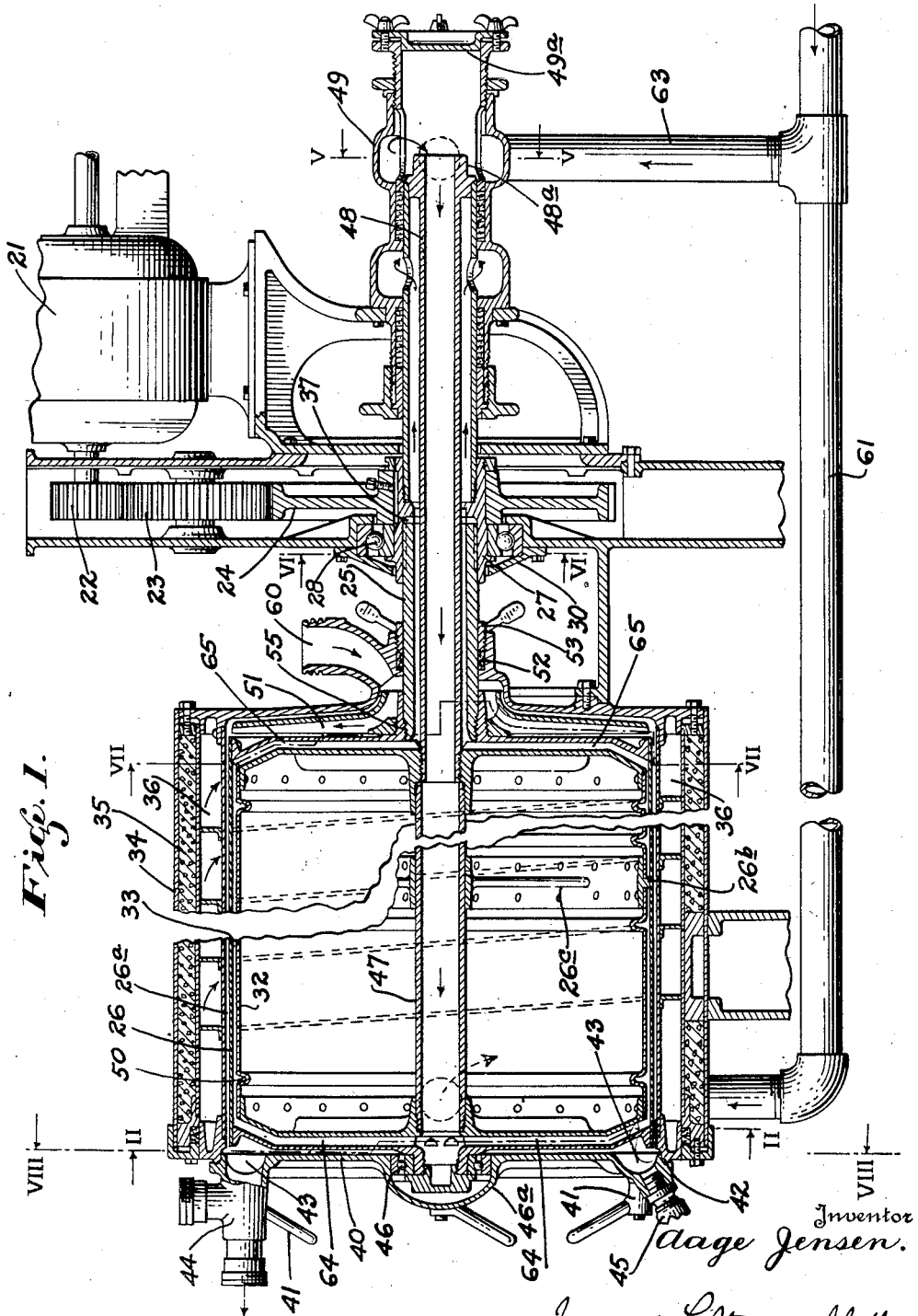
Fig. 1 is a vertical sectional view of a liquid treating unit.

In general, the apparatus comprises a stationary, insulated casing 34, provided with helical passageways 34a, through which a treating medium may circulate. The treating medium enters at 61 and is discharged at 62. A rotating drum 26, spaced from the inner wall of the helical passageways, provides a narrow, elongated passageway 26a, for fluid to be treated. The fluid to be treated enters at 60 and is discharged at 44. The drum 26 has a spaced lining 32 forming a jacket or chamber 33 for a treating medium, which treating medium enters at 63 and is discharged at 67. Thus the liquid being treated is surrounded on both sides with a suitable treating medium capable of heat exchange.

Details of the mechanism for rotating the drum 26, circulating the heat-treating medium through passageways 34a and 34, and conveying the fluid to be treated through passageway 26a, will now be described.

Referring more particularly to Fig. 1, I have shown a power unit 21 which, through gears 22, 23, and 24, imparts a rotary motion to a hollow shaft 25 upon which is secured a cylindrical drum 26. The gear 24 is attached to the shaft 25 by means of a specially designed collar 27 having splined grooves machined in its inner surface to engage external splined projections on the shaft 25, forming a longitudinally separable connection capable of imparting rotary motion. The collar 25 is provided with a ball bearing 28 which is protected by a shield 30.

Figure 8:
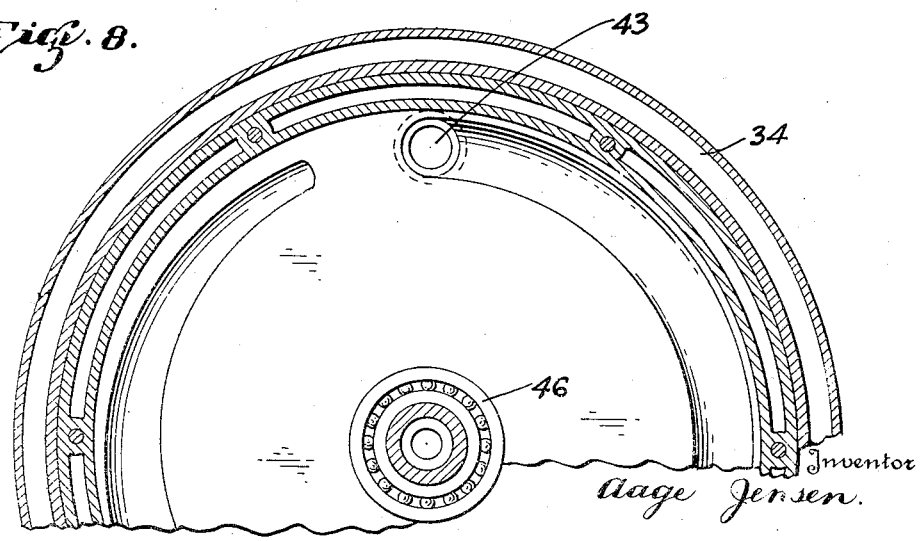
Fig. 8 is a partial cross-sectional view taken on the line VIII—VIII of Fig. 1.

A packing, preferably of block tin or annealed copper, provides a tight joint at 37 between the end of the shaft 25 and the collar 27 when drawn up by tightening the inner tube 48. The drum 26 encloses and supports a smaller drum or lining 32 so that a hollow chamber 33 extends between the two drums. This drum 26 with its lining 32 revolves within a stationary cylinder or housing having an outer casing 34, an insulating chamber 35, and a helical liquid-conducting flue 36. The cylinder or housing is provided with a removable head 40, maintained against its outer end by means of hand-operated screw clamps 41 and a ground metal V-shaped joint 42. The head 40 has an annular, tapering discharge groove 43 (better shown in Fig. 4) formed in its surface and communicating with a discharge pipe 44 at its upper side and a drain cock 45 at its lower side. A ball race 46, a cross-section of which appears in Fig. 8, is contained within a central raised portion of the head 46ª to form a bearing for a hollow axial shaft 47. The ball bearing, as well as the ball race 46, is made of chromium nickel alloy, to fully resist the corrosive action caused by contact with milk acids and to allow the same to be easily cleaned.

A tubular shaft 47 extends through the center of the revolving cylinder and communicates with a pipe 48 which is disposed within the hollow shaft 25 and terminates at a point within a manifold or circulating head 49.

Figure 3:
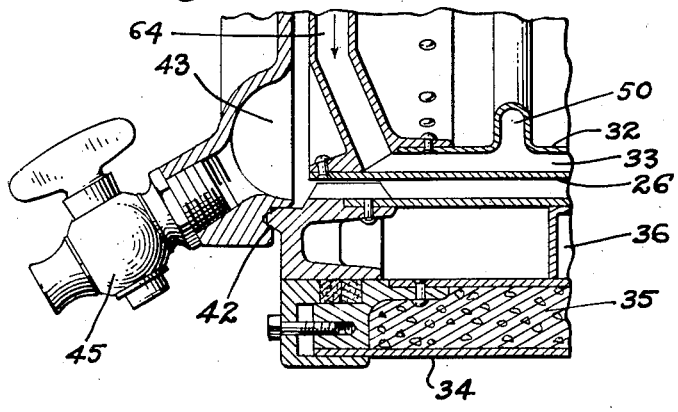
Fig. 3 is an enlarged sectional view of a portion of Fig. 1, showing construction details.

The lining 32 in the revolving drum is provided with annular, bellows-like expansion grooves 50, for the purpose of preventing distortion due to expansion and contraction under varying temperatures and conditions. An enlarged section of one of these grooves is shown in Fig. 3.

Figure 7:
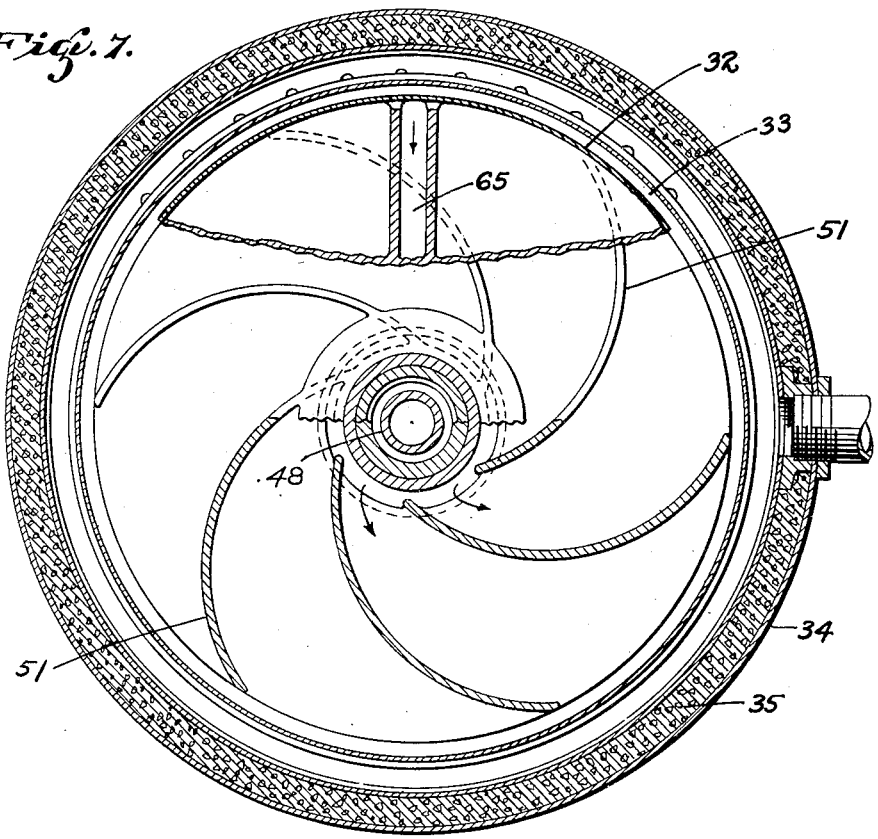
Fig. 7 is a cross-sectional view taken on the line VII—VII of Fig. 1.

A centrifugal-type impeller 51, having spiral blades (a cross-section of which is shown in Fig. 7) is located at the drive end of the drum and is revolved with the shaft 25.

For the purpose of preventing leakage of liquid to be treated, a packing gland 52 is formed in the drive end of the casing surrounding the hollow shaft 25. The packing used in this gland should be of sanitary or sterile material and should be renewed each time the machine is used, unless made of soft metal for the purpose of sanitation. The gland has a manually operated nut 53 securing the packing in position.

In practice, the machine is disassembled in the following manner:

The head 40 may be removed by the loosening of the screw clamps 41. Thereafter the cap 49a on the circulating head 49 is removed, exposing the hexagonal nut 48a on the shaft 48, which permits said shaft to be unscrewed from its connection with the core. Thus the splined end of the shaft 25 is made free, so that the revolving drum 26 and the shaft 25 may be pulled out of the main cylinder, and thus the outer surfaces of said drum and the inner surfaces of said main cylinder are readily accessible for cleaning purposes.

The impeller may be removed from the drum by unscrewing it at the threads shown at 55.

In operation there are two fluids flowing through separate parts of the machine, usually in counter-current direction. One is the fluid to be treated, and the other is the treating fluid, which may be either warmer or colder than the fluid to be treated, as the treatment demands.

The first, or treated fluid, such as milk or the like, enters the main cylinder by way of a tube 60 formed in the drive end thereof. The fluid is then picked up by the rapidly revolving centrifugal impeller unit and is forced by means of the blades 51 into and through the narrow annular passageway between the revolving drum and the inner surface of the main cylinder in a progressive, helical flow. When the milk has traversed the entire length of the cylindrical drum 26, it flows into the helical duct 43 and, by means of its centrifugal inertia and the pressure of the fluid body behind it, is discharged into the pipe 44.

The second or treating fluid flows under pressure from a supply means (not shown) such as a tank or a pump, and takes two separate courses within the machine. One course is as follows: The fluid enters through a pipe 61 which communicates with one end of the helical passageway formed by the metal strip 36 in the jacket surrounding the main cylinder, traverses this passageway, and is discharged through a pipe 62, shown in Fig. 10, which is in communication with the open end of the passageway. This discharge pipe 62 leads back to the source of supply, so that the same fluid is used repeatedly and a continuous circulating system is established.

Figure 2:
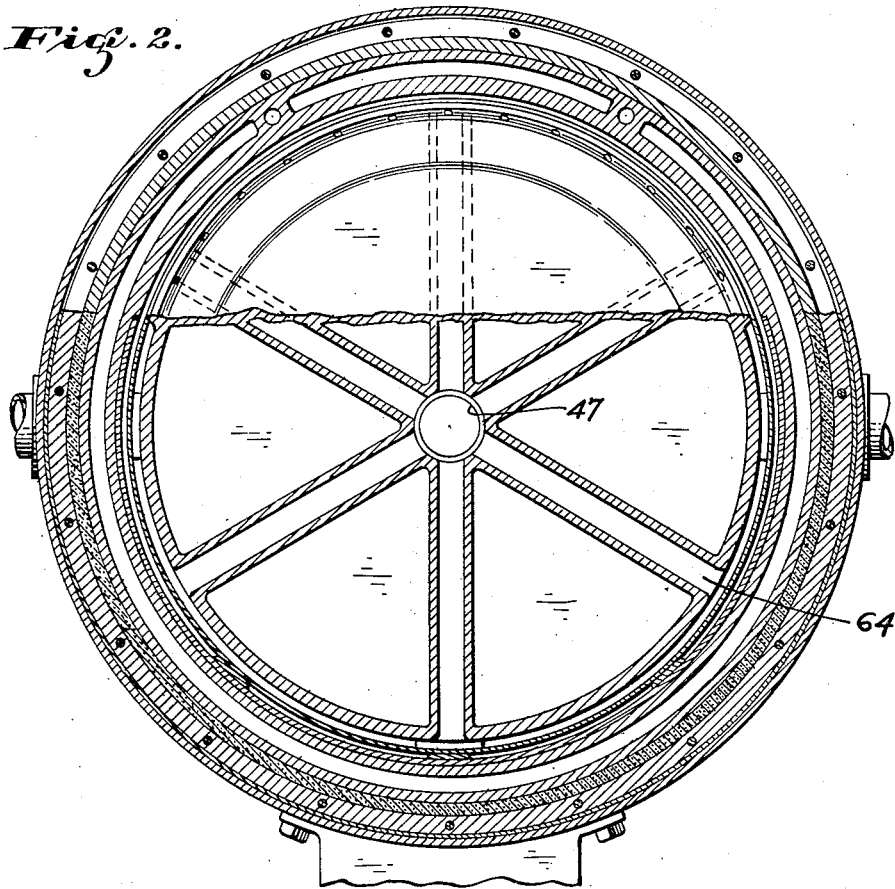
Fig. 2 is a sectional view taken on the line II—II of Fig. 1.

The other course followed by the treating fluid starts within the circulating head 49 to which the fluid is supplied by a pipe 63, which is an extension of the other supply pipe, 61. From within the circulating head 49 the fluid flows through the pipe 48 and the hollow shaft 47, and is conducted through radially disposed conduits 64, shown in cross-section in Fig. 2, to the narrow, annular passageway 33, formed between the revolving drum 26 and its lining 32.

From this passageway it flows through conduits 65, similar to conduits 64 but located in the opposite end of the drum, and then into the spacing between the shaft 25 and the pipe 48. From this space the fluid flows through ports 66 back into the circulating head 49 and is discharged through a pipe 67 (see Fig. 10) back into the main discharge pipe 62. By means of this double circulating system the fluid being treated is completely surrounded by the treating medium.

In Figs. 9 and 10 I show an assembly for processing in self-contained form, including a regenerator, heater, and cooler, with a portion of the cooler cut away.

In this assembly, milk or other liquid to be treated enters the supply pipe 70 through a distribution pipe 71, and thence emerges through apertures which distribute it evenly over the outer surface of a regenerator 72. The product is collected in a pan 73, from which it is discharged through a passageway 74 into a unit A, similar to that shown in Fig. 1, and which serves to transmit heat to the product. From here the product passes out through a pipe 76 to the interior of the regenerator and is returned through a pipe 77 to the inlet 60 of a unit B, similar to that illustrated in Fig. 1, and which in this instance serves as a cooler.

For certain operations the treating fluid is required to be hot, while for other operations it should be cold. To effect this change in operation it is merely necessary to change the temperature of the treating fluid, as the apparatus is mechanically adapted to perform either operation.

The drum 26 is of considerable length, and is supported intermediately by one or more spoked rings 26c having a peripheral feed 26b between the spaced walls of the drum, which means are perforated so as to permit the treating medium to pass through the space between the walls.

The ground metal joint 42 insures that alignment of the operating parts will be positively maintained in operative relation, and is such that should the surfaces become marred, the same can be corrected by re-grinding. This is of considerable importance in an apparatus of this type, where it is necessary on frequent occasions to remove the cover plate 40.

While I have illustrated a preferred embodiment of my invention, and certain features thereof are more or less specifically described, it should be understood that various changes in the construction and operation of its several parts may be resorted to without departing from the spirit and scope of the appended claims.

Having thus described my invention, what I claim as new and desire to secure by Letters Patent is:

1. In an apparatus for treating liquids, a stationary casing, a rotating drum spaced therefrom, the space between being adapted to receive liquid to be treated, passageways for a heat exchange medium adjacent to the space through which the liquid undergoing treatment is passed, a cover plate through which the material undergoing treatment is discharged, and a joint between the cover plate and the surrounding casings, comprising a V-shaped ground seal.

2. An apparatus for treating liquids, comprising a hollow shaft, a rotating sleeve surrounding the same, a drum fixed to said shaft and sleeve and rotated thereby, said drum containing spaced walls through which a heat exchange medium may be circulated, a casing surrounding the said drum and spaced therefrom so as to provide a relatively narrow passageway for the liquid to be treated, an impeller connected with said sleeve, through which liquid to be treated is introduced to said passageway, means for circulating a heat exchange medium through the parts of the casing in close relationship with the space through which the medium undergoing treatment is passing, and a cover plate at one end of the apparatus having a V-shaped ground joint with said casing, and a friction bearing between the cover plate and the rotating drum.

3. A liquid treating device of the character described comprising relatively rotating concentrically disposed drums spaced from each other to form a passageway for liquid to be treated, chambers adjacent each of said drums through which a treating medium may be circulated, and expansion means in each of said chambers.

4. In an apparatus for treating liquids, the combination of a cylindrical rotatable drum, a stationary cylindrical jacket surrounding the drum in closely spaced relation, means for causing the liquid to flow through the space between the drum and jacket, and a cover at one end of the jacket, said cover having an outlet port formed therein, and also having a helical duct leading to said outlet port.

5. In an apparatus for treating liquids, a revolving drum having spaced walls for the reception of a treating medium, a surrounding casing spaced from the drum whereby liquid to be treated may flow between the drum and the casing, a tubular extension on one end of the casing, a tubular extension on one end of the drum, said second named extension being journaled within the first named extension, a separate bearing member for the outer end of the second extension, and packing means between the extension and the bearing member.

6. An apparatus for treating dairy liquids, having an opening, a closure member for said opening, said container and said closure member being provided with a V-like projection and a V-like groove, said projection fitting into said groove.

7. An apparatus for treating dairy liquids, having an opening, a closure member for said opening, said container and said closure member being provided with a V-like projection and a V-like groove, said projection and groove being ground so that said projection fits in said groove.

8. An apparatus for treating dairy liquids, having an opening, a closure member for said opening, said container and said closure member being provided with a V-like projection and a V-like groove, said container and said closure member at said projection and groove being of metal and ground so that said projection fits in said groove.

9. A drum of cylindrical shape and having an essentially smooth, straight-line, cylindrical wall, said wall having a peripheral annular bellows-like groove formed therein, the width of said groove being small with respect to the length of said wall.

10. A drum of cylindrical shape and having an essentially smooth, straight-line, cylindrical wall, said wall having peripheral annular, spaced-apart, bellows-like grooves formed therein, the widths of said grooves being small with respect to the spacing therebetween.

11. In a fluid treating apparatus, a cylindrical double-walled drum forming a fluid passage, a second cylindrical double-walled drum forming a fluid passage, one of said drums being within the other, said drums forming a narrow fluid passage between them, one of said drums being rotatable with respect to the other, the outside cylindrical wall of said inner drum and the inside wall of said outer drum being smooth and straight-line cylindrical, one of said other drum walls being essentially smooth and straight-line cylindrical and having spaced-apart bellows-like grooves formed therein, the widths of said grooves being small with respect to the spacing between adjacent grooves.

12. In a fluid treating apparatus, a cylindrical double-walled drum forming a fluid passage between said walls, a helical wall extending between said walls and dividing the space therebetween into a helical path, a second double-walled cylindrical drum forming a fluid passage between the walls thereof, said second mentioned drum being rotatable within said first mentioned drum, the outer wall of said inner drum being adjacent to but spaced from the inner wall of said outer drum whereby a narrow passage is formed therebetween, all said cylindrical drum walls being essentially smooth and straight-line cylindrical, the innermost of said drum walls having spaced apart, bellows-like grooves formed therein, the widths of said grooves being small with respect to the spacing between adjacent grooves, inlet and outlet passages connecting with said helical passage, inlet and outlet passages connecting with the space formed by the walls of said inner drum, and inlet and outlet passages connecting with the space formed between said drums.

13. In a fluid treating apparatus, a cylindrical double-walled drum forming a fluid passage between said walls, a helical wall extending between said walls and dividing the space therebetween into a helical path, a second double-walled cylindrical drum forming a fluid passage between the walls thereof, said second mentioned drum being rotatable within said first mentioned drum, the outer wall of said inner drum being adjacent to but spaced from the inner wall of said outer drum whereby a narrow passage is formed therebetween, all said cylindrical drum walls being essentially smooth and straight-line cylindrical, the innermost of said drum walls having spaced apart, bellows-like grooves formed therein, the widths of said grooves being small with respect to the spacing between adjacent grooves, inlet and outlet passages connecting with said helical passage, inlet and outlet passages connecting with the space formed by the walls of said inner drum, inlet and outlet passages connecting with the space formed between said drums, and insulation on the outer side of said outer drum.

14. In an apparatus for treating liquids capable of corroding structural metals, two cylindrical drums each having a head at an end thereof, one of said drums being within the other and forming a passageway between the heads thereof and between the cylindrical walls thereof, an annular flange axially of said drums on each said head, and a non-corrosive ball-bearing between said flanges whereby one of said drums is rotatably mounted with respect to the other.

15. In an apparatus for treating liquids capable of corroding structural metals, two cylindrical drums each having a head at an end thereof, one of said drums being within the other and forming a passageway between the heads thereof and between the cylindrical walls thereof, an annular flange axially of said drums on each said head, and a non-corrosive ball-bearing of chromium nickel alloy between said flanges whereby one of said drums is rotatably mounted with respect to the other.

16. In an apparatus of the class described, a rotating driving means having an opening axially thereof, an annular flange in said opening and co-axial therewith, a hollow shaft in said opening, a spline connection between said shaft and said driving means, a packing between the end of said shaft and said flange, and means to draw said shaft towards said flange.

17. In an apparatus of the class described, a rotating driving means having an opening axially thereof, an annular flange in said opening and co-axial therewith, a hollow shaft in said opening, a spline connection between said shaft and said driving means, a packing between the end of said shaft and said flange, a conduit connected to said opening and having an abutment thereon, an inner conduit within said conduit and having an abutment abutting against said abutment, said inner conduit extending through and beyond said hollow shaft, a drum, and a double-walled rotatable drum therewithin, the inner wall thereof being connected to said inner conduit and the outer wall thereof being connected to said hollow shaft, the passage between the double walls of said inner drum being connected to said inner conduit and to the passage between said hollow shaft and said inner conduit.

18. In an apparatus of the class described, a rotating driving means having an opening axially thereof, an annular flange in said opening and co-axial therewith, a hollow shaft in said opening, a spline connection between said shaft and said driving means, a packing between the end of said shaft and said flange, a conduit connected to said opening and having an abutment therein, an inner conduit within said conduit and having an abutment abutting against said abutment, said inner conduit extending through and beyond said hollow shaft, a drum, and a double-walled rotatable drum therewithin, the inner wall thereof being connected to said inner conduit and the outer wall thereof being connected to said hollow shaft, the passage between the double walls of said drum being connected to said inner conduit and to the passage between said hollow shaft and said inner conduit, the connection between said inner conduit and the inner wall of said drum being a threaded screw connection, said conduit having a non-round exterior formation at the other end thereof.

19. In an apparatus of the class described, a cylindrical casing, a rotatable fluid forwarding means therein and axially thereof, a rotatable driving means, a splined connection between said driving means and said fluid forwarding means whereby said fluid forwarding means may be removed from said casing and disconnected from said driving means by axial displacement with respect thereto, a removable head forming a part of said casing, the cylindrical part of said casing and said head being provided with a V-like projection and a V-like groove, said projection fitting in said groove.

AAGE JENSEN.